(12) United States Patent
Hannig et al.

(10) Patent No.: US 12,427,803 B2
(45) Date of Patent: Sep. 30, 2025

(54) METHOD FOR PRODUCING A DECORATIVE PANEL HAVING IMPROVED SYNCHRONICITY BETWEEN DECORATION AND STRUCTURE

(71) Applicant: AKZENTA PANEELE + PROFILE GMBH, Kaisersesch (DE)

(72) Inventors: Hans-Jürgen Hannig, Bergisch Gladbach (DE); Sebastian Wendel, Bitburg (DE)

(73) Assignee: Akzenta Paneele + Profile GMBH, Kaisersesch (DE)

( * ) Notice: Subject to any disclaimer, the term of this patent is extended or adjusted under 35 U.S.C. 154(b) by 0 days.

(21) Appl. No.: 18/852,659

(22) PCT Filed: Mar. 24, 2023

(86) PCT No.: PCT/EP2023/057697
§ 371 (c)(1),
(2) Date: Sep. 30, 2024

(87) PCT Pub. No.: WO2023/198431
PCT Pub. Date: Oct. 19, 2023

(65) Prior Publication Data
US 2025/0214366 A1    Jul. 3, 2025

(30) Foreign Application Priority Data

Apr. 12, 2022    (EP) ..................................... 22167924

(51) Int. Cl.
*B44C 5/04*    (2006.01)
*B41F 19/02*    (2006.01)
(Continued)

(52) U.S. Cl.
CPC ................ *B44C 5/04* (2013.01); *B41F 19/02* (2013.01); *B44C 1/10* (2013.01); *B44C 1/24* (2013.01); *B44C 3/025* (2013.01)

(58) Field of Classification Search
None
See application file for complete search history.

(56) References Cited

U.S. PATENT DOCUMENTS

2013/0295352 A1* 11/2013 Thiers ....................... B44C 1/24
427/288
2017/0297257 A1* 10/2017 Kackmann-Schneider ................
B44F 9/02

FOREIGN PATENT DOCUMENTS

DE    102010025159 A1    12/2011
EP          3257654 A1    12/2017
WO       2016050696 A1     4/2016

* cited by examiner

*Primary Examiner* — Joshua D Zimmerman
(74) *Attorney, Agent, or Firm* — Harness, Dickey & Pierce, P.L.C.

(57) ABSTRACT

The present disclosure relates to a method for producing a structured decorative panel, comprising the method steps: a) providing a film that is to be structured; b) providing a stamping means for structuring the film; c) structuring the film using the stamping means so as to form at least one structured region on the film; d) ascertaining at least one dimension of at least one structured region after method step c); e) providing a substrate; f) applying a decoration to the substrate; wherein g) the at least one dimension of the structured region ascertained in method step c) is taken into consideration during the application of a decoration to the substrate; and h) applying the film to the substrate in such a way that the at least one structured region is synchronous with the decoration.

15 Claims, 2 Drawing Sheets

(51) Int. Cl.
*B44C 1/10* (2006.01)
*B44C 1/24* (2006.01)
*B44C 3/02* (2006.01)

METHOD FOR PRODUCING A DECORATIVE PANEL HAVING IMPROVED SYNCHRONICITY BETWEEN DECORATION AND STRUCTURE

CROSS-REFERENCE TO RELATED APPLICATIONS

This application is a U.S. National Phase Application under 35 U.S.C. 371 of International Application No. PCT/EP2023/057697, filed on Mar. 24, 2023, which claims the benefit of European Patent Application No. 22167924.4, filed on Apr. 12, 2022. The entire disclosure of the aforementioned European Patent Application is incorporated herein by reference.

FIELD

The present disclosure relates to a method for producing a structured decorative panel, in particular by performing a structuring synchronous with a decoration. The present disclosure further relates to a system with which such a method may be executed.

BACKGROUND

This section provides background information related to the present disclosure which is not necessarily prior art.

For the protection of a decorative layer applied to a substrate, wear or cover layers are usually applied above the decorative layer. It is often provided that a surface structuring imitating a decoration template is introduced into such wear or cover layers, so that the surface of the decorative panel has a haptically perceptible structure, which in its shape and pattern is adjusted to the applied decoration, in order to obtain a reproduction of a natural material that is, also in terms of haptics, as faithful to the original as possible.

For example, the structure is introduced in a known manner by embossing tools. Such a method, in which a structure is created by pressing into an, in particular, smooth surface, is referred to as negative structuring within the meaning of the present disclosure.

In such methods, as well as in other structuring, for example in structure-giving lacquer application processes, there is potential for improvement in the generation of synchronicity between the structure and decoration. In the case of negative structuring, for example, it is possible that the exact alignment of the embossing tools relative to the decoration may cause problems. The production of structured surfaces for wear protection may thus still be improved in certain circumstances.

SUMMARY

This section provides a general summary of the disclosure, and is not a comprehensive disclosure of its full scope or all of its features.

Therefore, an object of the present disclosure is to provide improved means for structured surfaces, for example for wear protection, which at least partially overcome the problems known in the related art.

A method for producing a structured decorative panel is described, comprising the method steps:
a) providing a film that is to be structured;
b) providing an embossing means for structuring the film;
c) structuring the film using the embossing means so as to form at least one structured region on the film;
d) ascertaining at least one dimension of at least one structured region after method step c);
e) providing a substrate;
f) applying a decoration to the substrate, wherein
g) the at least one dimension of the structured region ascertained in method step c) is taken into consideration during the application of a decoration to the substrate; and
h) applying the film to the substrate in such a way that the at least one structured region is synchronous with the decoration.

Such a method may enable an improved application of a film to a substrate in the production process of a decorative panel. In particular, an improved synchronicity between an optical decoration and a haptic structure may be enabled.

Within the meaning of the disclosure, the term "decorative panel" refers in particular to wall, ceiling, door, or floor panels, which have a decoration applied to a substrate plate. Decorative panels are used in a variety of ways both for the interior finishing of rooms and the decorative cladding of buildings, for example in the construction of exhibition stands. One of the most common areas of application of decorative panels is their use as floor covering or for cladding ceilings, walls, or doors. Here, the decorative panels often feature a decoration and a surface structuring intended to imitate a natural material.

To produce the decorative panel, the method first comprises method step a) of providing a film that is to be structured. As such, the film is to be provided with a haptically perceptible structure, which is to serve as a so-called synchronous pore ("Synchronpore") in the produced decorative panel. Furthermore, it may be preferred that the film covers the decoration applied to the substrate and thus represents a protective layer and/or wear layer. For example, the film may form the outermost layer of the produced decorative panel.

In the configuration of the film as a protective layer or wear layer, the film may cover the decoration from above to protect the decoration and substrate from external influences.

In this regard, it may be particularly preferable that the film comprises hard materials, preferably in an amount between ≥5 wt. % and ≤40 wt. %, wherein the hard materials preferably have an average grain diameter between 10 μm and 250 μm. Examples include titanium nitride, titanium carbide, silicon nitride, silicon carbide, boron carbide, tungsten carbide, tantalum carbide, aluminium oxide (corundum), zirconium oxide, zirconium nitride or mixtures thereof.

The configuration of the film is not limited in principle and is, in particular, dependent on the later use of the film or the composite of film and substrate. Preferably, the film may be formed of a plastic, preferably a thermoplastic plastic.

According to method step b), the method further comprises providing an embossing means for structuring the film. The embossing means serves, as indicated above, to introduce or, more precisely, press a structure into the film. For this purpose, the embossing means is in turn provided with a structure, which corresponds to the negative of the structure to be pressed in or to be formed. The structure may, for example, be introduced into the embossing means by engraving and may be based on structure data extracted from an existing digital print file. The digital print file may suitably be used for producing the decoration, as described in greater detail below. The digital print data may then be translated into structure data of the embossing means. For example, the structure data may be used for engraving, such as laser engraving. Alternatively, the structure data may also be generated by three-dimensional scanning of a structure template, such as structured real wood.

With regard to the embossing means, it may be advantageous that it comprises an embossing roller or, in other words, for an embossing roller to be used as the embossing means. Such embossing means are characterised by the fact that they can be produced easily and are also safe and reliable in operation. However, included in the scope of the present disclosure is also that the embossing means is, for example, a circumferential band, i.e. an embossing band, or also a metal pressing sheet. By using an embossing band, or a metal pressing sheet or metal embossing sheet, the duration of the action of the embossing means on the film can be extended, which may also be advantageous in terms of structure formation. For example, it is possible to work with a lower pressure.

Correspondingly, the embossing means enables a negative structuring, by means of which, according to method step c), the structuring of the film using the embossing means may be carried out so as to form at least one structured region on the film. Thus, after structuring by the embossing means, the film has one or more structured regions, which are intended to correspond to the structure of the decorative panel and which are correspondingly adjusted to the decoration data of the produced decorative panel. The one or more structured regions may correspond to the surface of the decorative panel to be produced, which is to be provided with a structure. For example, the one or more structured regions may correspond to the decorative regions of the decorative panels to be produced.

According to method step d), the method further comprises ascertaining at least one dimension of at least one structured region after method step c). In this method step, at least one dimension of the one or more structured regions is thus ascertained after the film has been structured. This method step is carried out, for example, under ambient conditions, i.e. in particular at ambient temperature or at least after a certain cooling of the film after the structuring. For example, this method step may be carried out at room temperature, i.e. in particular at 22° C. or in a range around 22° C. with a maximum deviation of +15° C. However, it may in principle be sufficient that the determination of the at least one dimension is carried out after the structuring.

The ascertaining at least one dimension of the structured region may be carried out in a manner known per se to the person skilled in the art, depending on the specific dimension chosen. For example, a two-dimensional extent, i.e. the length and/or width, may be ascertained by camera-based methods or scanner-based methods. In principle, an optical sampling of the structured region may be advantageous. In a manner understandable to the person skilled in the art, "ascertaining the dimension" equally refers to ascertaining a dimensional change during structuring or in other words through structuring, as this allows direct conclusions to be drawn about the dimension.

Furthermore, according to method step e), a substrate is provided, in particular a substrate that is to be provided with the film or onto which the film is to be applied.

The type of substrate is not limited in principle, as long as the substrate is able to serve as an underlayer or foundation for the film. In other words, in principle, any structure that serves as a support for a film to be laminated may be understood to be a substrate. In the case of producing a decorative panel, however, the substrate may be a substrate suitable for this purpose. In this case, a substrate may in particular be understood to be a layer serving as a core or a base layer in a finished panel, which may in particular comprise a natural material, such as a wooden material, a fibre material, or a material comprising a plastic. For example, the substrate may give a panel suitable stability or contribute thereto. Here, the substrate may in particular be a web-like substrate or a plate-shaped substrate. For example, such a substrate may be formed of plastic and may be formed of pure plastic or a plastic material. Here, a plastic material shall be a material that, in addition to pure plastic, may also contain other components, in particular fillers, such as mineral or inorganic components.

Furthermore, according to method step f), a decoration is applied to the substrate. Within the meaning of the present disclosure, it is particularly advantageous that the decoration is printed onto the substrate, in particular by means of a direct printing method.

Within the meaning of the disclosure, the term "direct printing" refers to applying a decoration directly onto the substrate of a panel or onto a fibre material layer applied to the substrate that has not or only partially been printed onto. Contrary to conventional methods, in which a decorative layer onto which a desired decoration has been printed is applied to a substrate, direct printing involves printing the decoration directly in the course of panel production. Here, different printing techniques may be utilized, such as flexography, offset printing, or screen printing. In particular, digital printing techniques, such as inkjet methods or laser printing methods, may be used.

In order to enable a particularly precise print image with particularly high accuracy of the decoration, the substrate may preferably be treated with means for changing the electrostatic charge of the substrate before feeding it into the printing unit and/or during the printing process in the printing unit, by first discharging the substrate electrostatically and then adding a defined amount of charge to the substrate where appropriate.

According to the disclosure, it is also provided that in method step g) the at least one dimension of the structured region ascertained in method step c) is taken into consideration during the application of a decoration to the substrate.

Correspondingly, the decoration is not necessarily applied, in particular printed, strictly according to predetermined data independent of the size of the structured regions, but, during the application of the decoration, in particular when printing the decoration, the at least one dimension of the structured region(s) is taken into consideration. In particular, the dimension of the decoration, whose dimension of the structured region is taken into consideration, is adjusted to the corresponding dimension of the structured region. For example, the length and/or width of the decoration may be adjusted to the ascertained length and/or width of the structured region, and the decoration may be printed correspondingly. Thus, an adjustment of the print data takes place before or during the production process, such that the original print data may be used or adjusted correspondingly while exactly adhering to the dimension(s) of the structured region.

In the case that the dimension includes, for example, the length and/or width of the structured region as described below, an adjustment may be made by adjusting the length and/or width of the decoration correspondingly. For this purpose, decoration data previously ascertained and stored, which is associated with certain parameters of the dimension, may be used where appropriate. In other words, when the dimension is a certain value, decoration data previously associated with the corresponding dimensions may be used to print the decoration. Alternatively, a computational correction of the decoration data may be performed directly based on the ascertained dimension(s) by adjusting the decoration, for example its extent or size, during the process by creating adjusted decoration data to be used according to the dimension(s).

According to method step h), the applying of the structured film to the decorated substrate is further performed in such a way that at least one structured region is synchronous with the decoration. Thus, for example, the entire substrate, for example an entire surface of the substrate, may be provided with the film, or the substrate may be provided with the film only partially.

This may be realized, for example, by guiding the film to the substrate and then, for example by means of a roller, pressing it onto the substrate at a temperature higher than room temperature (22° C.) and a pressure higher than ambient pressure (1 bar). This method step may also be referred to as laminating and may in principle be executable in a selectable manner. For example, wet laminating or dry laminating, wherein the laminating is performed using a wet or dry laminating means, shall be included in the scope of the disclosure.

If the substrate and film are made of different polymers, it is preferable to work with an adhesive and/or a bonding layer or hotmelt as laminating means. Coextruded thermoplastic functional layers, which are fixedly connected to the substrate or film during production, are also conceivable as a bonding layer, such as EVA (ethylene-vinyl acetate copolymer) or a grafted MAH (maleic anhydride grafted polymer). The laminating parameters are then set according to these functional layers between the film and substrate. Here, exemplary parameters include a temperature of 70° C. to 100° C. for EVA, depending on the vinyl acetate content in the EVA, and a pressure of 1 to 10 bar. However, when laminating, care should be taken to set temperature and pressure sufficiently low to avoid damaging the previously embossed structure, which is easily possible using, for example, laminating means.

After this step, the film may be firmly fixed on the substrate. Where appropriate, a post-treatment, such as drying or hardening of the laminating means or the film, may be carried out if necessary.

In the described method, it may further be provided that the film is electrostatically charged before its application to the substrate and that the substrate is electrostatically charged before the film is applied to the substrate. Electrostatic charging may in principle be carried out as known in the prior art of other fields, for example by means of ionisation devices. In principle, it is preferred that the electrostatic charging of the substrate and the film is performed in such a way that the film and the substrate are electrostatically charged oppositely. For example, the substrate may be charged negatively and the film may be charged positively, or vice versa, the substrate may be charged positively and the film may be charged negatively.

This method step may allow an electrostatic attraction to exist between the substrate and the film. This allows a particularly intimate connection, for example when the substrate is provided with the film over a large area.

Furthermore, it may be preferred that at least one of the substrate and the film is electrostatically discharged before the electrostatic charging. In this configuration, the aforementioned advantages may be achieved particularly safely and well-defined.

According to the method of the disclosure and in particular due to the at least one dimension of the structured region ascertained in method step c) being taken into consideration during the application of a decoration to the substrate in method step g), it may become possible that a particularly exact synchronicity of the haptic structure with the decoration is achieved. This is because the forming of the structure and the decoration is not carried out exclusively according to predetermined data, but an adjustment of decoration and structure is carried out based on the actual dimensions of the structure. Here, it may be in particular taken into consideration that when introducing the structure, in particular when pressing in the structure using pressure and heat, the film may change its size, such that the finally produced structured regions do not necessarily have to correspond to the region originally intended for structuring.

The change in size or dimensional change may depend on the materials of the film, the thickness of the film, the specific structure introduced, as well as the embossing conditions, in particular the temperature used during embossing. Other influencing factors of the embossing behaviour include the embossing speed and the tensile behaviour of the film, which in particular is a parameter of the material. Accordingly, it is not always possible to exactly predict the dimensional change of the film caused by the structuring.

Accordingly, the method of the disclosure allows for particularly high demands on the synchronicity between structure and decoration regardless of the conditions used, the specific configuration of the film, and the structure pressed in, and thus enables a particularly high-quality decorative panel to be produced.

If the film is provided with a lacquer before embossing, such as a UV-curable acrylic lacquer, which already represents the final surface, this has the further advantage that the final lacquering of deep structures is less problematic, for example with regard to the occurrence of glossy spots.

Preferably, the at least one dimension may include the length of the structured region. Alternatively or additionally, the at least one dimension may include the width of the structured region. In particular, the length and/or width of the structured region(s) may reliably indicate a dimensional change, which as a whole is representative of the dimensional change even in small regions of the film, since a dimensional change usually extends evenly across the structured region. Thus, by adjusting the total length or the total width of the decoration, an adjustment may also be correct in the individual structure elements. Thus, this configuration may allow an adjustment of the decoration to the structure in a simple manner.

In addition, the length and/or width of the structured regions may be easily ascertained by optical sampling, allowing the method to be reliably implemented.

With regard to the film, it may be preferred that it is formed of plastic, for example made thereof or also includes other components. More specifically, the film may comprise an acrylic-based plastic compound, in particular a polyurethane-modified acrylic plastic compound, wherein the film may comprise the plastic compound in an at least partially, for example completely, hardened form, such that it is transportable for laminating and may be treated correspondingly. Where appropriate, a final hardening of the film that might be necessary may be performed in a further step subsequent to the lamination. This may be performed, for example, by high-energy and short-wave UV radiation and will lead to additional cross-linking of the monomers in addition to the radical polymerisation of the acrylate groups. This significantly increases the surface hardness. Water-based systems are also possible.

This advantageously achieves that the film is flexible overall and at the same time has particularly good protective properties, such as stability, scratch resistance, heat resistance, water resistance, and the like, for many applications, for example as a protective layer of a decorative panel.

The plastic compound of the film may preferably comprise a dipropylene glycol diacrylate, preferably in an amount of >0 to ≤15 wt. % based on the plastic compound, and a reaction product of pentaerythritol, epichlorohydrin, and acrylic acid, preferably in an amount of ≥2 to ≤15 wt. % based on the plastic compound.

Furthermore, the film may also be constructed of other, especially thermoplastic, plastics, such as polyethylene terephthalate (PET) or polypropylene.

It may also be preferred that the embossing means has a neutral region adjacent to at least one structure-embossing region in the longitudinal direction. A neutral region is, in particular, understood to refer to a region that is not provided with a structure that is adjusted to a decoration. Thus, the neutral region does not serve to create a synchronous pore.

By providing such a neutral region, it may be achieved that the distance between two structured regions of the film, in particular in the longitudinal direction of the film, is adjusted to the distance between two regions of the substrate when the film is laminated. It is particularly preferred that an adjustment be made to the distance between two decorative regions, in particular of different substrates. Thus, the film is structured in the longitudinal direction only at the positions that are positioned on a decorative region when the substrate and film are merged.

By a clear delineation between structured regions and neutral regions, this configuration allows for improving and simplifying the positioning of the film on the substrate in such a way that the synchronicity between the decoration and the structure may be further improved. The risk of mispositioning the film on the substrate and thus the structure on the decoration may thus be further reduced.

For example, the neutral region may at least partially have a structure different from the structure-embossing region. In this configuration, the different structure may, for example through a defined structure, facilitate camera-based detection.

Alternatively, the neutral region may at least partially comprise a structure-free region. This may also be easily distinguished from the structure-embossed region based on cameras.

The distance between two decorative regions of different substrates may, for example, refer to the plate distance in a lamination system, i.e. the distance between two substrates, or also a larger distance, for example when margins are not to be provided with a structure.

Accordingly, it may be preferred that the film is applied in the longitudinal direction to a plurality of substrates, each substrate comprising a surface that is to be structured, the surfaces that are to be structured of different substrates being spaced apart, and the distance between the surfaces that are to be structured corresponding to the length of a neutral region.

It should preferably be ensured by maintaining the process parameters, for example at least for the structuring of film batch, such as a roll of film, that structured regions and free regions always have the same length dimension and also that the dimension always remains the same. This may prevent the ratio of decorative to structured regions from changing and thus the synchronicity of decoration and structure from deteriorating. This may be achieved, for example, by stable temperature and tension control in the embossing plant.

It is further preferred that a registration mark is applied to the decoration and the film. A registration mark may refer to a mark that indicates whether the film is positioned on the substrate at the desired and planned position. If the registration marks are positioned directly on top of each other or with a predefined relationship to each other, it may be ensured that the film is correctly positioned and thus high requirements for the synchronicity between decoration and structure can be met.

It is further preferred that a plastic-containing substrate is used as the substrate. More preferably, the substrate may comprise a material including a plastic and, where appropriate, further components. Plastics, which can be used in the production of corresponding panels or the substrate, include, for example, thermoplastic plastics, such as polyvinyl chloride, polyolefins, for example polyethylene (PE), polypropylene (PP), polyamides (PA), polyurethanes (PU), polystyrene (PS), acrylonitrile butadiene styrene (ABS), polymethyl methacrylate (PMMA), polycarbonate (PC), polyethylene terephthalate (PET), polyether ether ketone (PEEK) or mixtures or co-polymers thereof. The plastics may contain typical fillers, for example calcium carbonate (chalk), aluminium oxide, silica gel, quartz powder, wood dust, and gypsum. They may also be dyed in a known manner. The substrate may preferably include talcum as a filler material, for example in an amount, based on the total material of the substrate, of ≥30 wt. % to ≤70 wt. %, in particular from ≥40 wt. % to ≤60 wt. %. Furthermore, it may be provided that the substrate has a multi-laminar structure, i.e. comprises a plurality of films. Here, the films may be the same as or different from the film to be laminated.

In particular in decorative panels, such plastic substrates are preferred for many applications and may also be easily provided with a film, such that the method may be easily performed in this configuration.

It may further be preferred that process parameters and dimensional change data of a film, i.e. data regarding a dimensional change of the film during structuring, are stored and are compared to process parameters and dimensional change data of the film or another film during a structuring at a later point in time. In this configuration, a logic check may thus be carried out, as at least a rough prediction is possible in which region a dimensional change is sensible or to be expected. This may, for example, reduce false measurements or detect errors in the structuring. The stored and compared data may, for example, include the dimensional change as such, and the process parameters may include the pressing pressure, the pressing temperature, the materials of the film, and/or the thickness of the film.

The method for producing a decorative panel preferably comprises the additional method step:

i) introducing locking means at the edges of the substrate.

To form a decorative panel, locking means are provided at the edges of the substrate, for example circumferentially. This may be realized, for example, by machining the substrate edges, as is known in principle in the related art. As such, a stable composite serving as floor covering or ceiling covering or wall covering may be created from a plurality of panels, likewise in a known manner.

For further technical features and advantages of the method, reference is made to the description of the system, the figures, and the description of the figures.

Furthermore, a system for producing a decorative panel is described, comprising:

an embossing means for structuring a film that is to be structured so as to form at least one structured region on the film;

a dimensioning means for ascertaining at least one dimension of at least one structured region after the embossing of the film;

a decoration means for applying a decoration to a substrate, wherein the at least one dimension of the structured region is able to be taken into consideration during the application of the decoration to the substrate; and a merging device for applying the film to the substrate in such a way that the at least one structured region is synchronous with the decoration.

The system described herein serves, in particular, to perform a method as described in detail above.

For this purpose, the system comprises an embossing means for structuring a film that is to be structured so as to form at least one structured region on the film. The embossing means may be configured as described above and may include, for example, an embossing roller or band, or a metal embossing sheet or metal pressing sheet.

Furthermore, the system comprises a dimensioning means for ascertaining at least one dimension of at least one structured region after the embossing of the film. The dimensioning means is suitably arranged downstream of the embossing means in regard to the direction of travel of the film. For example, the dimensioning means includes a camera or a scanner, which optically samples the structured film and thus ascertains the size of the structured region. The dimensioning means may be, for example, an analogue or digital dimensioning means.

The additionally included decoration means for applying a decoration to the substrate may, in particular, be a direct printing device, such as, in particular, a digital printer. The controller of the digital printer may be connected to the dimensioning means or a control unit thereof, for example by a data connection. This may allow to take into consideration a specific dimension of the structured region of the film during the application of the decoration. Alternatively, the dimension of the structured region may be entered manually into the decoration means.

Finally, a merging device for applying the film to the substrate in such a way that the at least one structured region is synchronous with the decoration is included. The merging device may, for example, be configured as a lamination system and ensure by a corresponding control that the substrate and the film, and thus the decoration and the structure, are placed on top of each other synchronously.

Such a system may, in particular, improve the synchronicity of a decoration with a structure and thus enable a decorative panel of a particularly high quality.

For further technical features and advantages of the method, reference is made to the description of the system, the figures, and the description of the figures.

DRAWINGS

The drawings described herein are for illustrative purposes only of selected embodiment(s) and not all possible implementations, and are not intended to limit the scope of the present disclosure.

Below, the disclosure will be explained by way of example with reference to the accompanying drawings, wherein the features shown below may represent an aspect of the disclosure both individually and in combination, and wherein the disclosure is not limited to the following drawing, the following description, or the following embodiment.

FIG. 1 schematically shows a system for producing a decorative panel;

Corresponding reference numerals indicate corresponding parts throughout the view of the drawings.

DETAILED DESCRIPTION

Example embodiment(s) will now be described more fully with reference to the accompanying drawings.

Figure 1:
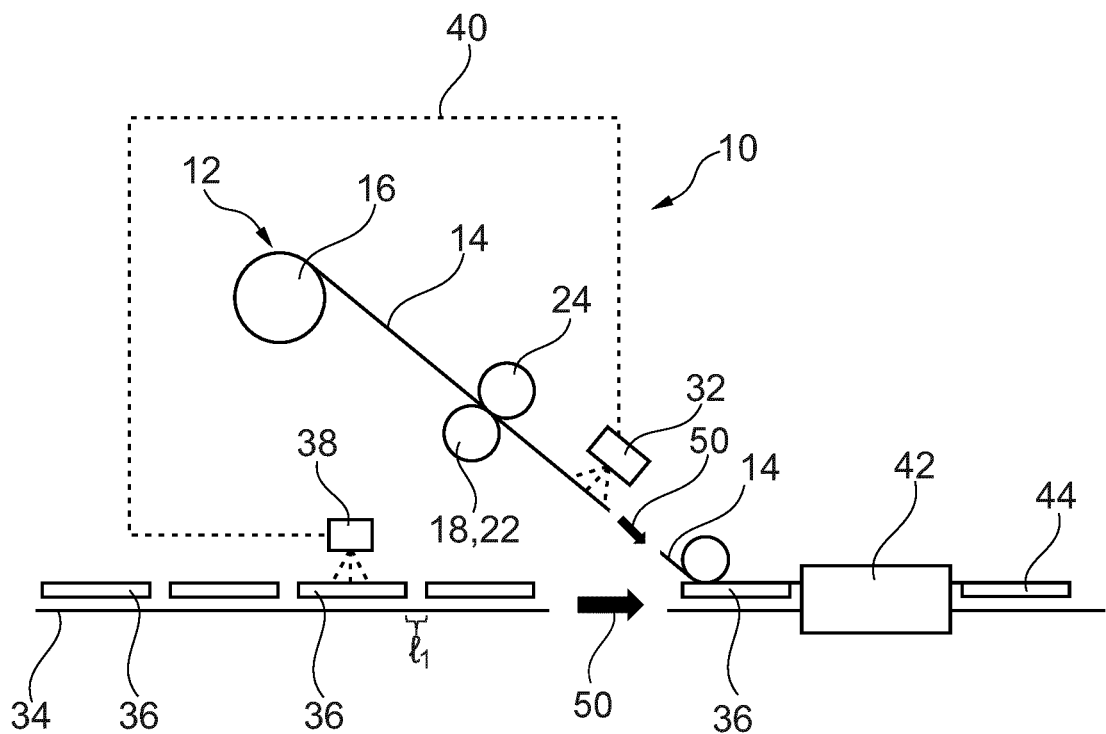

In FIG. 1, a system 10 for producing a decorative panel is shown. The system 10 comprises a feed unit 12 for a film 14 that is to be structured. Through the feed unit 12, which according to FIG. 1 is a roll 16 with the film 14 rolled up, the film 14 can be fed to an embossing means 18 for structuring the film 14 so as to form at least one structured region 20 on the film 14. The embossing means 18 is, according to FIG. 1, an embossing roller or a embossing cylinder 22, which can structure the film 14 while the film 14 passes through a gap limited by the embossing cylinder 22 and a counter roller 24.

Figure 2:
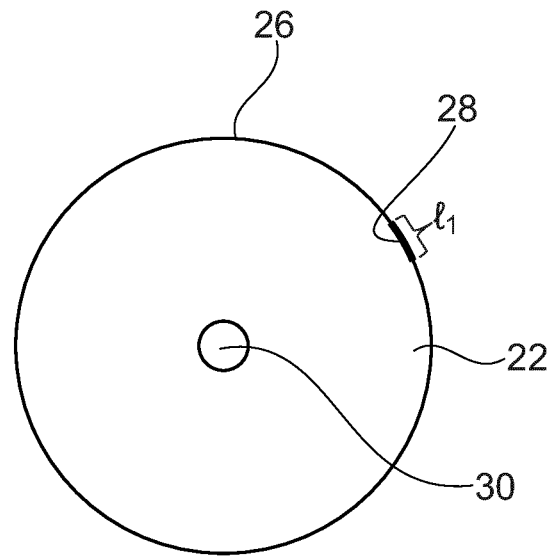
FIG. 2 shows an embossing roller for a system according to FIG. 1.

The embossing cylinder 22, which is able to be rotated about an axis 30, is shown by way of example in FIG. 2. There, it can be seen that the embossing cylinder 22 has a structure-embossing region 26 and a neutral region 28 on its outer circumference, which has a length $l_1$. A structure, which was digitally extracted from decoration data and may be the negative of the structure to be introduced into the film 14, is engraved in the structure-embossing region 26, for example. The neutral region 28 may, in particular, be free of any structures and have a smooth surface, or may have a structure different from the structure-embossing region 26.

Returning to FIG. 1, a dimensioning means 32 for ascertaining at least one dimension of at least one structured region 20 after the embossing of the film 14 is also shown. According to FIG. 1, the dimensioning means 32 is, in particular, an optical dimensioning means 32, such as a camera, which optically samples the structured film 14 and thus detects the desired dimension, such as in particular the length or the width, of the structured region 20. However, in principle, an analogue dimensioning means may also be used and/or a dimensioning may be performed using a registration mark 48.

Furthermore, a feed device 34 for a plurality of plate-shaped substrates 36 is shown, wherein the feed device 34 is configured as a conveyor belt. The feed device 34 feeds the substrates 36 to a decoration means 38, which serves to apply a decoration to the substrates 36. In FIG. 1, the decoration means 38 is configured as a digital printer, which may have a suitable number of print heads. Here, the decoration means 38, for example a control unit thereof, is connected to the dimensioning means 32 via a wireless data connection 40, for example in case the dimensioning means 32 works digitally. This may enable that the at least one dimension of the structured region 20 may be taken into consideration during the application of the decoration to the substrate 36. Due to the simple adjustability of the digital print file, the print may be finely adjusted to the structure in regard to its synchronicity.

Finally, the film 14 and the substrates 36 travel to a merging device 42 for applying the film 14 to the substrate 36 in such a way that the at least one structured region 20 is synchronous with the decoration. The merging device 42, which is only shown schematically in FIG. 1, may, in particular, be configured as a lamination system. Downstream of the merging device 42 or the lamination system, a decorative panel 44 may have been produced, in which the substrate 36 is provided with a decoration and a structured film 14, the structured film 14 being synchronous with the decoration.

Accordingly, a method for producing a structured decorative panel 44 may be executed by the system 10 shown in FIG. 1, the method comprising the method steps:
 a) providing a film 14 that is to be structured;
 b) providing an embossing means 18 for structuring the film 14;
 c) structuring the film 14 using the embossing means 18 so as to form at least one structured region 20 on the film 14;
 d) ascertaining at least one dimension of at least one structured region 20 after method step c);
 e) providing a substrate 36;
 f) applying a decoration to the substrate 36, wherein
 g) the at least one dimension of the structured region 20 ascertained in method step c) is taken into consideration during the application of a decoration to the substrate 36; and
 h) applying the film 14 to the substrate 36 in such a way that the at least one structured region 20 is synchronous with the decoration.

In principle, the system 10 may be configured as a connected system 10 in which the steps are executed in a connected manner. In this case, the processes at the positions of the arrows 50 continue without interruption. However, it is also possible to interrupt the individual process strands and thus store the structured film 14 temporarily, for example before or, as shown in FIG. 1 by the arrow 50, after the dimensioning means 32. Correspondingly, the printed substrate 16 may also be stored before passing through the merging device 42 or the lamination system, as intended to be represented by the arrow 50. Accordingly, the structured film 14 may be laminated onto the printed substrate 36 if necessary.

Figure 3:
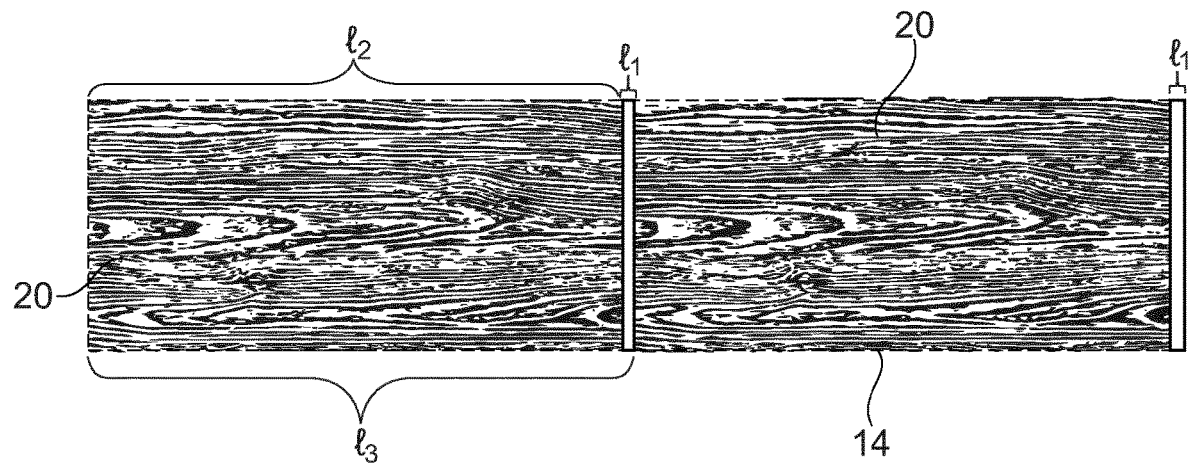
FIG. 3 shows a film structured using the embossing roller in FIG. 2 in a first embodiment.

FIG. 3 shows a film 14 with two structured regions 20, which were produced by an embossing cylinder 22 according to FIG. 2. Here, it can be seen that a distance between two structured regions 20 along the length of the film 14 corresponds to the length $l_1$ of the neutral region 28 of the embossing cylinder 22 as well as the distance of two substrates 36 shown in FIG. 1. The length $l_2$ corresponds to the length of the structured region 20 and the length $l_3$ corresponds to one completed revolution of the embossing cylinder 22. For example, the length $l_2$, i.e. the length of the structured region 20, is a dimension that is taken into account when producing the decoration. Purely by way of example and in no way limiting, the neutral region 28 or the distance between two structured regions 20 may have a length $l_1$ of, for example, 25 mm, and the structure-embossing region 26 or the structured region 20 may have a length $l_2$ of 1300 mm.

Figure 4:
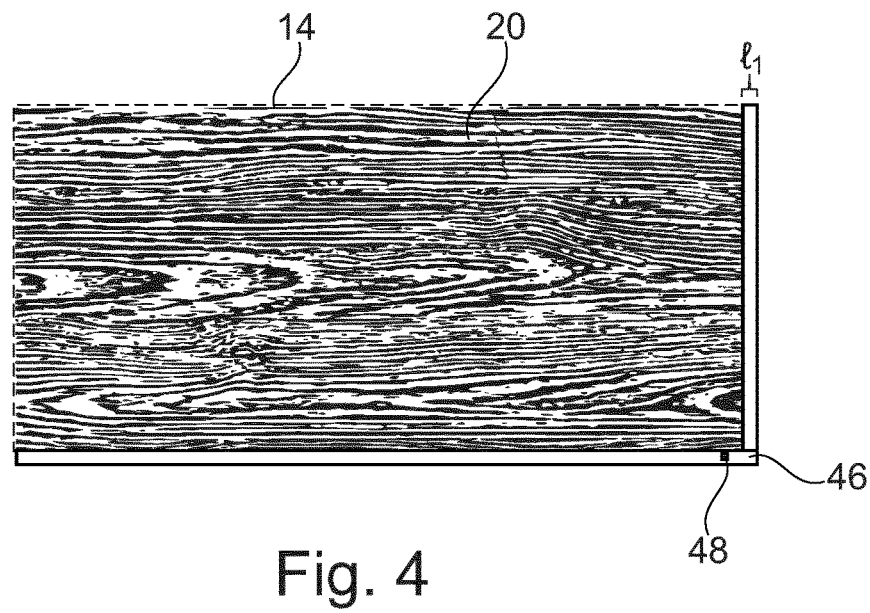
FIG. 4 shows a film structured using the embossing roller in FIG. 2 in another embodiment.

FIG. 4 shows a further configuration of a structured film 14 with a structured region 20. According to FIG. 4, a lateral marginal region 46 is provided, which extends along the length of the film 14. In this marginal region 46, a registration mark 48, such as a registration cross, may be provided, which can improve the merging of substrate 36 and film 14.

The marginal region 46 may be removed after the application of the film 14 to the substrate 36, which may be advantageous for full coverage of the substrate 16.

The foregoing description of the embodiment(s) has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

The invention claimed is:

1. A method for producing a structured decorative panel, comprising the method steps:
 a) providing a film that is to be structured;
 b) providing an embossing means for structuring the film;
 c) structuring the film using the embossing means so as to form at least one structured region on the film;
 d) ascertaining at least one dimension of at least one structured region after method step c);
 e) providing a substrate;
 f) applying a decoration to the substrate, wherein
 g) the at least one dimension of the structured region ascertained in method step c) is taken into consideration during the application of a decoration to the substrate; and
 h) applying the film to the substrate in such a way that the at least one structured region is synchronous with the decoration.

2. The method according to claim 1, wherein the at least one dimension includes the length of the structured region.

3. The method according to claim 1, wherein the at least one dimension includes the width of the structured region.

4. The method according to claim 1, wherein the film comprises an acrylic-based plastic compound, in particular a polyurethane-modified acrylic plastic compound, polypropylene, or polyethylene terephthalate.

5. The method according to claim 1, wherein method step f) is performed using a digital printing process.

6. The method according to claim 1, wherein at least one of an embossing cylinder, a embossing band, and a metal embossing sheet is used as the embossing means.

7. The method according to claim 1, wherein method step g) is performed by using existing decoration data associated with corresponding dimensions, or by performing a computational correction of decoration data based on the dimension.

8. The method according to claim 1, wherein the embossing means has a neutral region adjacent to at least one structure-embossing region in the longitudinal direction.

9. The method according to claim 8, wherein the neutral region at least partially has a structure different from the structure-embossing region.

10. The method according to claim 8, wherein the neutral region at least partially comprises a structure-free region.

11. The method according to claim 8, wherein the film is applied in the longitudinal direction to a plurality of substrates, each substrate comprising a surface that is to be structured, the surfaces that are to be structured of different substrates being spaced apart, and the distance between the surfaces that are to be structured corresponding to the length $l_1$ of a neutral region.

12. The method according to claim 1, wherein a registration mark is applied to the decoration and the film.

13. The method according to claim 1, wherein a plastic-containing substrate is used as the substrate.

14. The method according to claim 1, wherein process parameters and dimensional change data of a film are stored and are compared to process parameters and dimensional change data of the film or another film during a structuring at a later point in time.

15. A system for producing a decorative panel, comprising:
- an embossing means for structuring a film that is structured to form at least one structured region on the film;
- a dimensioning means for ascertaining at least one dimension of at least one structured region after the embossing of the film;
- a decoration means for applying a decoration to a substrate, wherein the at least one dimension of the structured region is taken into consideration during the application of the decoration to the substrate; and
- a merging device for applying the film to the substrate in such a way that the at least one structured region is synchronous with the decoration.

* * * * *